(12) United States Patent
Singer

(10) Patent No.: US 7,243,928 B2
(45) Date of Patent: Jul. 17, 2007

(54) FOLDABLE FIELD TRANSPORTABLE CART FOR SMALL BOATS

(76) Inventor: Andrew Singer, 23 Albin St., Glen Cove, NY (US) 11542

( * ) Notice: Subject to any disclaimer, the term of this patent is extended or adjusted under 35 U.S.C. 154(b) by 241 days.

(21) Appl. No.: 10/896,345

(22) Filed: Jul. 20, 2004

(65) Prior Publication Data

US 2006/0017246 A1   Jan. 26, 2006

(51) Int. Cl.
B62B 1/26   (2006.01)
(52) U.S. Cl. ................. 280/47.331; 280/40; 280/63
(58) Field of Classification Search .......... 280/47.331, 280/414.1, 414.2, 645, 42, 39, 40, 35, 651, 280/652, DIG. 6, 767, 293, 47.19; 114/344
See application file for complete search history.

(56) References Cited

U.S. PATENT DOCUMENTS

| | | | | |
|---|---|---|---|---|
| 1,109,520 A | | 9/1914 | Flower .................... 280/47.32 |
| 2,042,598 A | | 6/1936 | Harvey ........................ 440/53 |
| 2,347,947 A | * | 5/1944 | Hamilton .................. 280/47.16 |
| 2,540,279 A | | 2/1951 | Mosier ..................... 280/414.2 |
| 2,637,050 A | | 5/1953 | Oliver ......................... 114/344 |
| 2,810,589 A | * | 10/1957 | Tarleton .................. 280/414.1 |
| 2,818,268 A | * | 12/1957 | Johnson ........................ 280/42 |
| 2,844,383 A | | 7/1958 | Deeter ................. 280/124.116 |
| 2,893,580 A | | 7/1959 | Fischer ........................ 414/460 |
| 2,970,846 A | | 2/1961 | Boston ........................ 280/40 |
| 3,026,981 A | * | 3/1962 | Youtie ....................... 193/35 R |
| 3,093,386 A | | 6/1963 | Case ........................... 280/42 |
| 3,125,351 A | * | 3/1964 | McDonough .......... 280/47.331 |
| 3,164,392 A | | 1/1965 | Lane ....................... 280/47.331 |
| 3,445,018 A | | 5/1969 | Reagan ........................ 414/462 |
| 3,567,241 A | | 3/1971 | Foschino .................. 280/47.32 |
| 3,572,743 A | * | 3/1971 | Parr ............................. 280/42 |
| 3,687,476 A | | 8/1972 | Abbott .................... 280/47.32 |
| 3,734,528 A | * | 5/1973 | Echols, Jr. .................... 280/42 |
| 3,779,573 A | * | 12/1973 | Gullberg et al. ............. 280/656 |
| 3,977,690 A | * | 8/1976 | Carn ..................... 280/47.331 |
| 3,985,372 A | | 10/1976 | Olsson ....................... 280/652 |
| 4,059,282 A | | 11/1977 | Prickett ................... 280/47.13 |
| 4,127,281 A | * | 11/1978 | Ferguson ............... 280/47.331 |
| 4,214,774 A | | 7/1980 | Kluge ........................ 280/652 |
| 4,232,879 A | * | 11/1980 | Boxrud ....................... 280/656 |
| 4,286,800 A | | 9/1981 | Lomas ........................ 280/414 |
| 4,300,252 A | | 11/1981 | Montooth ....................... 9/1.2 |
| 4,392,665 A | | 7/1983 | Miller et al. .............. 280/414.2 |
| 4,422,665 A | | 12/1983 | Hinnant ................... 280/414.2 |

(Continued)

Primary Examiner—Paul N. Dickson
Assistant Examiner—Bridget Avery
(74) Attorney, Agent, or Firm—Alfred M. Walker

(57) ABSTRACT

A lightweight foldable cart for transporting on wheels one end of a small boat including a pair of identical frame or strut members, each being U-shaped with spaced arms extending parallel to each other from ends of a rear plate. Distal ends of the arms each include an opening for a shaft so that when the shaft extends through the openings joining the distal ends of the arms the frame members can be rotated about the shaft from an extended, deployed position to a folded position for storage. Each rear plate has an opening for an axle, which extends through the openings in the rear plate for supporting rotatable wheels at each end of the axle. A boat supporting bumper is mounted on the distal ends of the arms when the strut members are extended into the deployed position. The bumper is shaped to accommodate a bottom of the end of the boat to be supported and transported.

20 Claims, 6 Drawing Sheets

U.S. PATENT DOCUMENTS

| | | | |
|---|---|---|---|
| 4,538,829 A * | 9/1985 | Horowitz | 280/641 |
| 4,579,357 A | 4/1986 | Webster | 280/47.13 |
| 4,712,803 A | 12/1987 | Garcia | 280/47.13 |
| 4,822,065 A | 4/1989 | Enders | 280/47.331 |
| 4,824,127 A | 4/1989 | Stamm | 280/47.331 |
| 4,852,895 A | 8/1989 | Moffitt | 280/47.131 |
| 4,936,595 A | 6/1990 | Cunningham | 280/47.331 |
| 5,072,959 A | 12/1991 | Marullo | 280/47.331 |
| 5,203,580 A | 4/1993 | Cunningham | 280/47.331 |
| 5,207,441 A | 5/1993 | Granbery | 280/204 |
| 5,261,680 A | 11/1993 | Freitus et al. | 280/47.331 |
| 5,320,371 A | 6/1994 | Levad | 280/204 |
| 5,348,327 A | 9/1994 | Gieske | 280/47.331 |
| 5,791,279 A | 8/1998 | Hart | 114/344 |
| 5,941,544 A | 8/1999 | Fiedler | 280/47.331 |
| 5,975,003 A | 11/1999 | Manson | 114/344 |
| 6,032,964 A | 3/2000 | Capobianco | 280/47.331 |
| D427,407 S | 6/2000 | Witt | D34/24 |
| 6,142,492 A | 11/2000 | DeLucia | 280/47.331 |
| 6,189,900 B1 | 2/2001 | MacDonald | 280/47.331 |
| 6,270,092 B2 | 8/2001 | Darling, III | 280/30 |
| 6,364,336 B1 | 4/2002 | Jenkins | 280/414.2 |
| 6,416,066 B1 | 7/2002 | Ciulis | 280/47.331 |

* cited by examiner

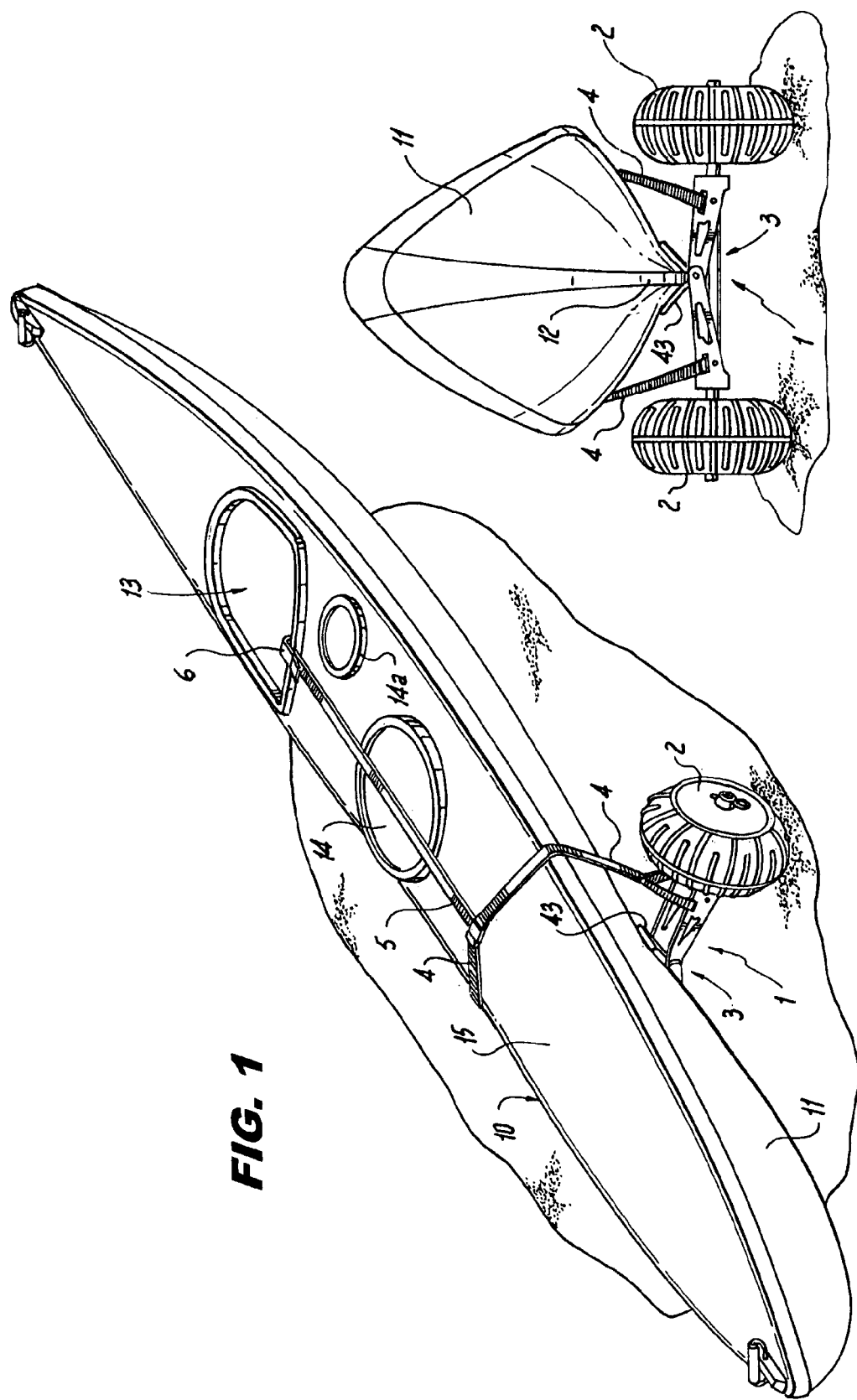

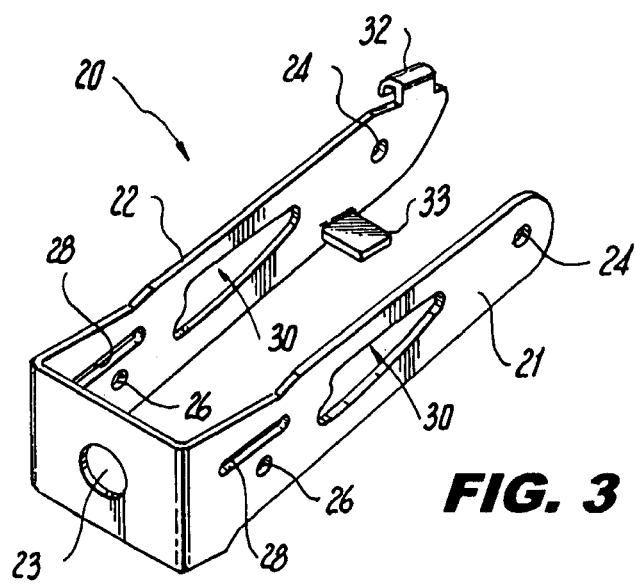
FIG. 3
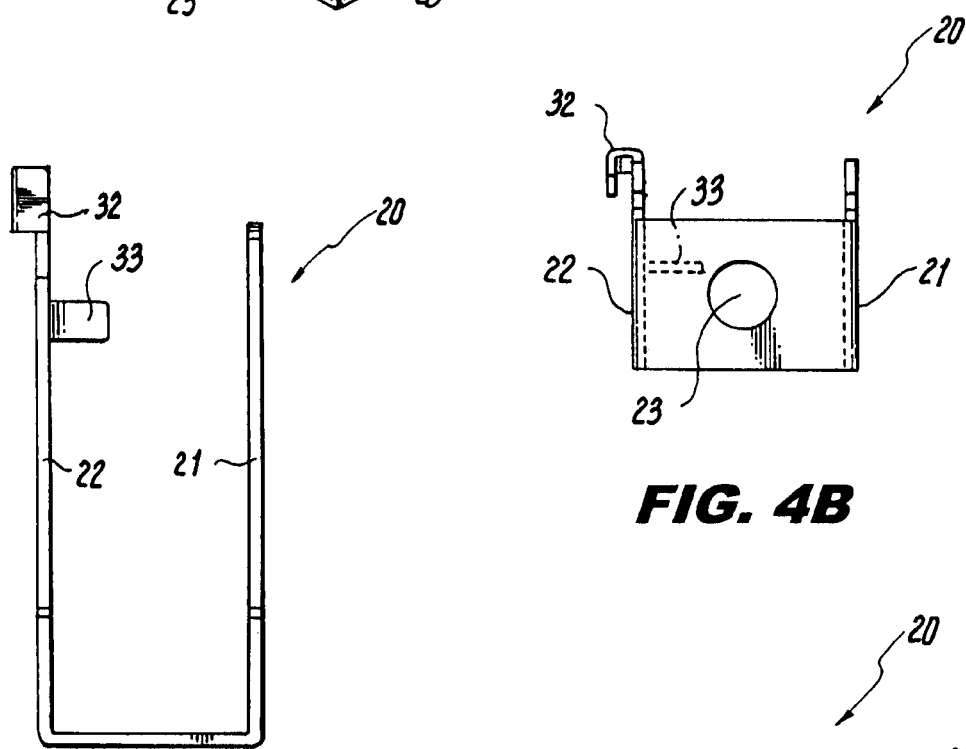
FIG. 4A
FIG. 4B
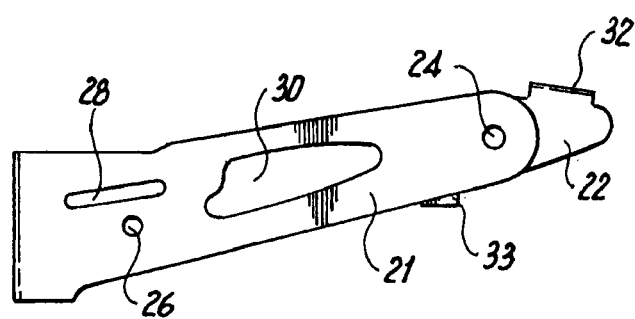
FIG. 4C

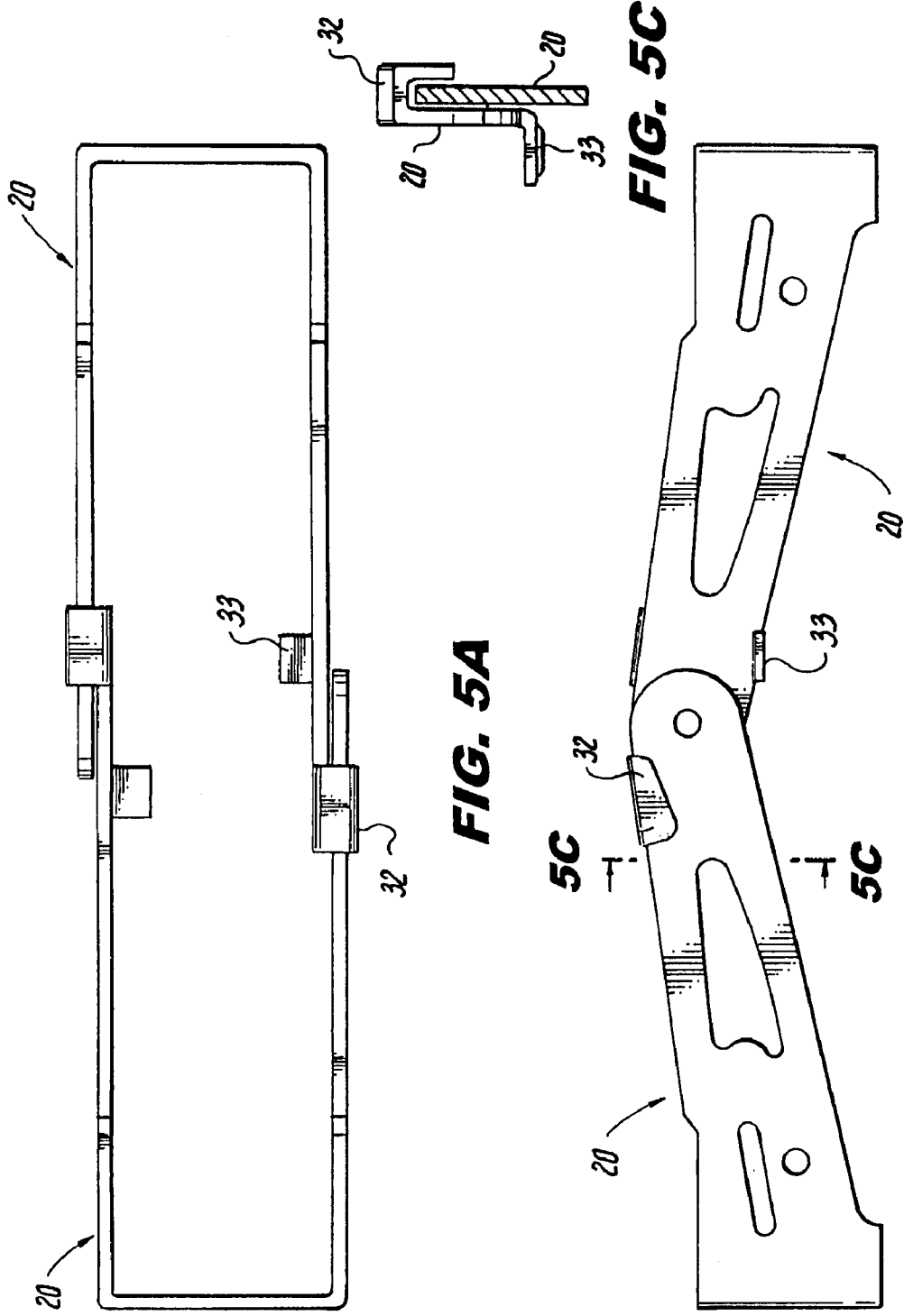

FOLDABLE FIELD TRANSPORTABLE CART FOR SMALL BOATS

FIELD OF THE INVENTION

This invention relates to a strong, lightweight foldable cart, which when affixed to one end of a touring or sea kayak, canoe, rowing shell or small boat and the boat lifted and pulled or pushed from the opposite end, transports the boat over various terrain. The main structure of the cart can stow very compactly inside a hatched compartment.

BACKGROUND OF THE INVENTION

Various single and multiple use carts exist which can carry or transport a canoe, kayak or small boat by hand. None of the existing carts however, fold up as compactly, specifically to fit in the sealed hatch compartment of many touring or sea kayaks. This is essential for camping trips, which may entail transporting a loaded kayak by ferry, or for moving boat, paddling equipment and supplies over various terrain to another location, either a campsite or for portage. The design of the cart, its method of folding and the possibility of using various wheel options with the same unit is unique to this cart.

OBJECTS OF THE INVENTION

It is therefore an object of this invention to provide a cart that is light, strong, easily and quickly assembled and disassembled and comprised of few parts.

It is also an object to provide a cart that will allow transport over various soft and hard terrains through the use of wheels otherwise used as dock bumpers.

It is further an object to provide a cart that will, by the use of different type, size and width wheels, allow transport over a more limited range of terrain, but will store in a more compact space.

Further, it is an object to use the same strong, light, foldable frame and attachment system, with different axle sizes to accommodate the different wheel options.

It is yet another object to provide a foldable boat cart wherein pivotable frame members are optionally locked in position in an inverted V-shaped configuration at an oblique angle by limit stops, thereby distributing the weight of the boat support load to wheels located at opposite outward ends of the foldable cart.

It is yet another object of the invention to provide a cart, the main component of which folds small enough to stow compactly inside the hatch compartment of a touring or sea kayak or similar craft, requiring about the same space as many compact backpacking stoves or fuel containers.

In addition it is an object to provide quick and easy attachment through the use of synthetic webbing and plastic buckles and a hook to secure the cart to the boat.

It is also an object to provide an accessory polymer, rubber or foam bumper to protect the bottom of the hull on the end opposite to the one the wheels are attached to as it rests on the ground.

SUMMARY OF THE INVENTION

In keeping with these objects and others, which may be apparent, this invention relates to a strong lightweight foldable cart which folds to store in a compact space. The main frame of this cart is comprised of two identical halves, each the same.

The two wheel foldable cart of this invention is adaptable to use for transporting a kayak, canoe, rowing shell, or small boat over a variety of terrain. The cart is easily erected and dissembled; furthermore, when completely disassembled, all of the foldable structural frame component parts of the cart will fit into a sealed hatch compartment of a typical kayak. Sealed hatch compartments of a typical kayak are generally from about eight to twelve inches in depth, with circular or elliptical openings having a width of from about five to about nineteen inches wide. For example, while dimensions may vary to enable the folded cart to fit within a kayak hatch, a preferred embodiment of the main structural frame components folds small enough to stow compactly inside the hatch compartment of a touring or sea kayak or similar craft, requiring about the same space as many compact backpacking stoves or fuel containers. For example, a typical twenty two ounce, six hundred fifty milliliter cylindrical fuel bottle container is generally about nine and one half inches in height and three inches in diameter. Likewise, the folded cart of the present invention is about eight inches in height and three inches at its widest width. Additionally, depending upon wheel size, the wheels and axle parts will fit either within a hatch compartment, or in any storage space under the deck of the kayak. Furthermore, if the kayak lacks hatch compartments, the structural components, wheels and axle parts will fit under the deck in whatever storage area exists in a typical kayak. Additionally, the component parts will fit in any designated storage area of a canoe, sit-on-top kayak or other small boat.

Detached from the boat, the cart can be folded into a compact configuration.

The basic structural design is based on the use of two identical rigid frame members which are engaged to each other and to a non-marring resilient boat pad via a single bolt. The two frame members preferably lock in an inverted oblique V-shaped configuration with respect to each other, upon spreading from a pivot point on the assembly bolt. In the locked configuration, a wheel axle is then inserted through the frame and wheels are attached with spring pins. Two different types of wheels are provided to accommodate different terrain. For soft sand, high floatation wide small wheels (toroidal-shaped marine dock bumpers) are used. Narrow wheels are used to traverse forest terrain, rough terrain, or firmer, harder terrain. Nylon webbing is used to attach the cart to the boat. The hull rests atop the resilient pad and transverse straps preferably engage slots in the frame members and encircle the boat hull. Preferably, a longitudinal strap attaches the transverse strap assembly to a transverse structural member, such as the cockpit opening of a kayak or thwart of a canoe, to prevent the transverse strap from slipping off at the end of the boat. Although this is the preferred embodiment of the straps, many alternative strap arrangements can be used as long as they engage the frame members and the boat in a functional manner. The frame geometry raises the hull of the boat above the axle to provide clearance for the boat hull without the need for a wide wheel-to-wheel dimension.

Three different axle configurations are described. The most simple and robust is a straight single axle. This is inserted through the axle holes in the frame members; then wheels are attached and captured via lynch pins inserted through transverse holes adjacent to axle ends. A two-piece axle can be used in a similar manner once the two sections are attached. Since it is in two sections, each section is only about half as long as the one-piece axle. The two sections couple near the middle via a spring clip button release. A third axle option includes two short axles, one for each wheel. Each axle is inserted through an axle hole in one of the frame members and then attached to the frame member by inserting a bolt through the side flanges of the frame and transversely through the hole near the inner end of the short axle. This last option permits the cart to be folded compactly when removed from the boat while leaving axles attached. The longer axles must be removed from the frame to fold the frame compactly.

The frame members can be fabricated of aluminum plate welded at corners or bent into a U-shape. Magnesium or titanium castings can also be used. Resin composite such as fiberglass reinforced or carbon fiber reinforced epoxy can also be used. Composite honeycomb plates with corner fittings can also be used to create very lightweight ultra-rigid frame members, or the frame members can be injection molded.

The V-shaped boat pad of the cart is a resilient rigid material such as, for example, rubber or a polyurethane, or other suitable material.

BRIEF DESCRIPTION OF THE DRAWINGS

The present invention can best be understood in connection with the accompanying drawings. It is noted that the invention is not limited to the precise embodiments shown in drawings, in which:

FIG. 1 is a Perspective detail showing the transportable cart of this invention attached to a V-section of the hull of a kayak;

FIG. 2 is a Rear, low angle partial bottom elevation view of the cart of this invention, attached to a V-section of a hull of a boat as in FIG. 1;

FIG. 3 is a Perspective view of one frame member of the transportable cart of this invention;

FIG. 4A is a Top view of the frame member as in FIG. 3;

FIG. 4B is a Front view of the frame member as in FIG. 3;

FIG. 4C is a Side view of the frame member as in FIG. 3;

FIG. 5A is a Top view of assembly of two frame members of this invention, shown deployed in a locked position;

FIG. 5B is a Side view of assembly of two frame members of this invention, shown deployed in a locked position;

FIG. 5C is a close-up front detail view of a limit stop for the frame members of this invention;

DETAILED DESCRIPTION OF THE INVENTION

Figure 6:
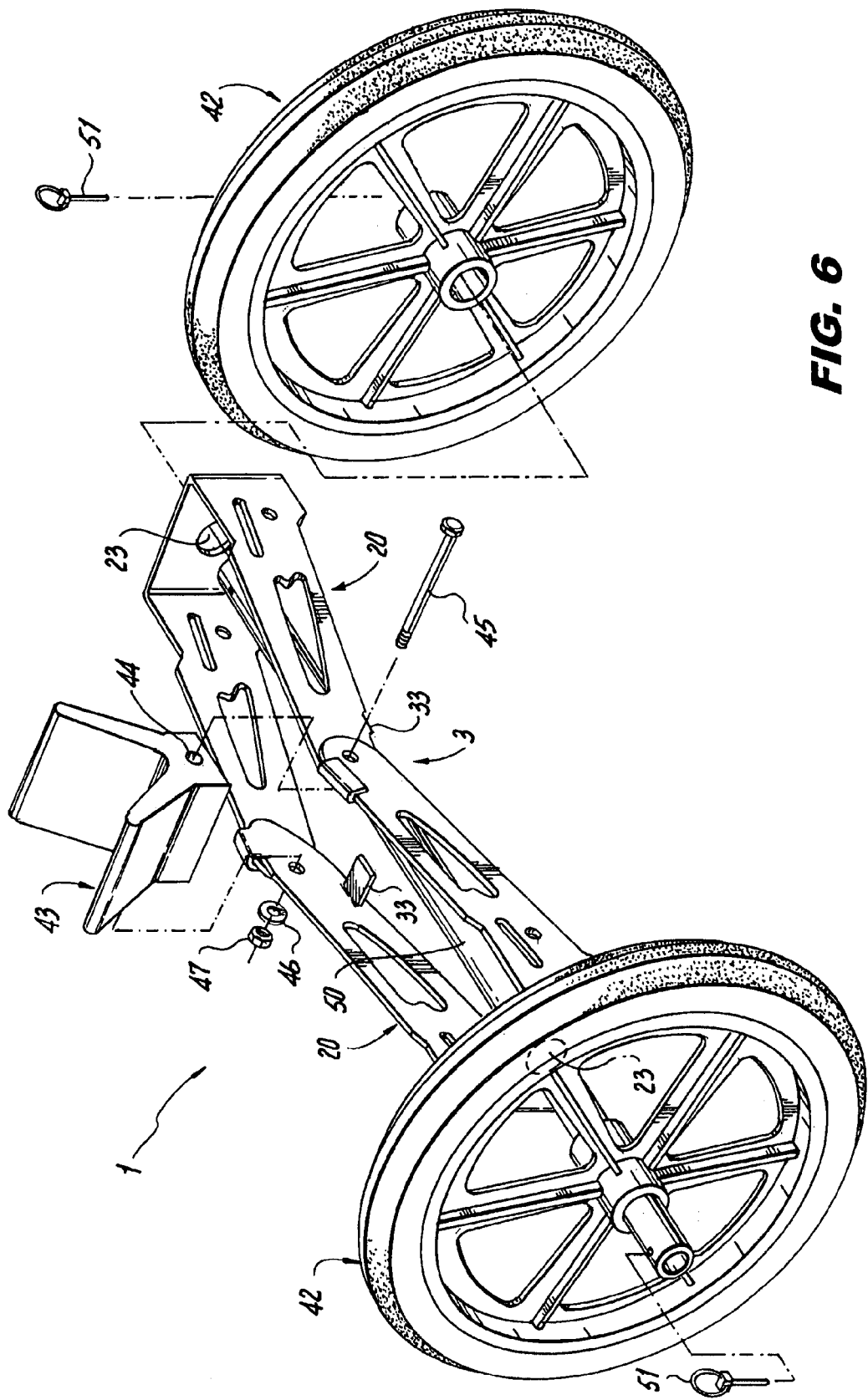
FIG. 6 is a Perspective exploded view of the cart assembly of this invention.

For illustrative purposes only, a preferred mode for carrying out the invention is described herein, wherein a transportable cart 1 carries a small boat, such as kayak 10.

FIG. 1 shows a detail of cart 1 of this invention attached to kayak 10 having hull 11 and hatch compartments 14, 14a. Cart 1 uses transverse strap 4 engaged with frame 3 of cart 1. Kayak 10 engages V-shaped boat pad 43 of cart 1 and is supported thereon. A high floatation wheel 2 is shown in FIG. 1. Longitudinal strap 5 is used to prevent strap 4 from disengaging at the end of kayak 10. It is held at its distal end by using hook 6 engaging edge 13 of the cockpit of kayak 10. Preferably, hook 6 can be modified to have a tension lock capability to fit the cockpit rim.

FIG. 2 shows V-shaped boat pad 43 of cart 1 attached to V-section 12 of the kayak 10 with hull 11. It is noted that while V-section 12 is shown extending axially lengthwise as a keel in FIG. 2, cart 1 can also be used with boats having a limited V-section in the bow or stern of the boat, such as a canoe (not shown) or other kayaks (not shown).

FIG. 3 shows the key structural element of cart 1, which is frame member 20, as shown in FIG. 3 and as in three orthogonal views of FIGS. 4A,B and C. With slight variations, these Figures represent frame members of any material from aluminum to carbon fiber to injection molded synthetic materials, such as nylon or other plastics. Two of these rigid frame members 20 are used in every cart. They are small enough to fit in a kayak hatch. Frame members 20 are U-shaped with side flanges 21 and 22 attached to an end plate with axle hole 23. Some of the features include shaped lightening holes 30, attachment strap slots 28, axle hole 23, short axle retaining holes 26, limit stop 32, boat pad stop tab 33 and pivot holes 24. Inwardly extending stop tabs 33, upon which a base of boat supporting pad 43 rests in position, prevent rotation of boat supporting pad 43. While the drawing Figures show axle holes 23 to accommodate axles therethrough, it is noted that optionally, partial axles can be permanently attached to the respective frame members.

Preferably, frame members 20 are locked in position in an oblique inverted V-shaped configuration at an oblique angle by limit stops 32, distributing the weight of the boat support load to wheels 2 at opposite outward ends of foldable cart 1.

It is further noted that while frame members 20, 20 are U-shaped, they may have other structural configurations, and may be plates, rods or struts, each having a face accommodating a hole for an axle to extend therethrough. Additionally, the V-shaped boat pad may either be joined by the common pivot joining frame members 20, or the V-shaped boat pad may optionally be cantilevered from one of the frame members.

FIGS. 5A, and 5B show the assembly configuration of the two identical frame members 20 in their locked position, shown spread apart with limit stops 32 engaging edge of opposite frame member 20. FIG. 5C is a close-up front detail view of limit stop 32 for the frame members 20.

FIG. 6 is an exploded view of cart 1. The assembly sequence is to overlap the side flanges of the two frame members 20, as in FIG. 5A, with pivot holes 24 in registration. Then V-shaped boat pad 43 is inserted between frame members 20 with hole 44 in registration with holes 24. Bolt 45 is then inserted through attaching frame members 20 to each other and to boat pad 43. Washer 46 and nut 47 are then fitted on the end of bolt 45 and tightened. After frame 3 subassembly is completed, axle shaft 50 is inserted into holes 23 and wheels 42 are placed on the protruding ends of axle shaft 50 and retained with lynch pins 51. Optional washers (not shown) may be provided between respective arms 20 and 20 to reduce friction. Optionally, boat pad 43 may be mounted in position to one frame member 20 (not shown), extending cantilevered therefrom.

Figure 7:
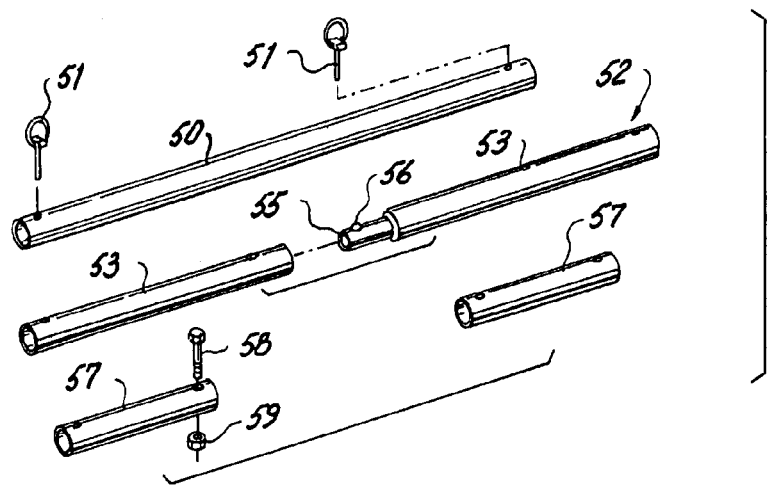
FIG. 7 is a Perspective view showing three different axle configurations of the boat cart of this invention.

FIG. 7 shows three different axle configurations. First is straight axle 50 as had been illustrated in FIG. 6. A two-part axle 52 is shown with section 53 and section 52 which has a coupling extension 55 which fits the inner diameter of section 53. Spring clip 56 button retains section 53 onto extension 55 by snapping into the transverse coupling hole. The third axle configuration includes of two short axles 57 which are attached to frame members 20 via bolt 58 going through side flange holes 26 and locked via nut 59.

Figure 8:
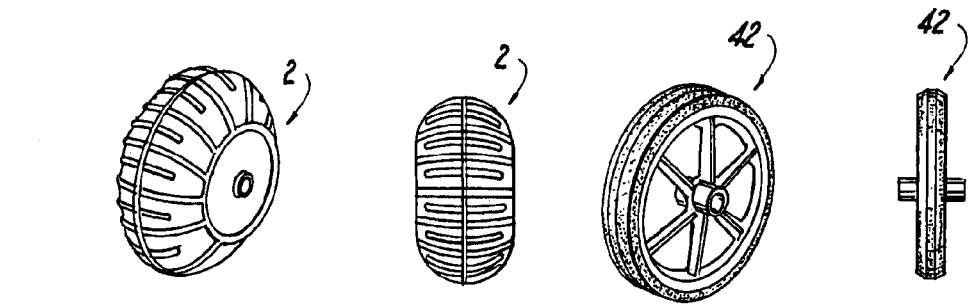
FIG. 8 is a Perspective and end views of two alternate wheel designs for the boat cart of this invention.

FIG. 8 compares the two wheel variations. Wheel 2 is a high floatation type for smooth soft ground. Wheel 42 has narrower tires for traversing rougher or firmer hard terrain.

Figure 9:
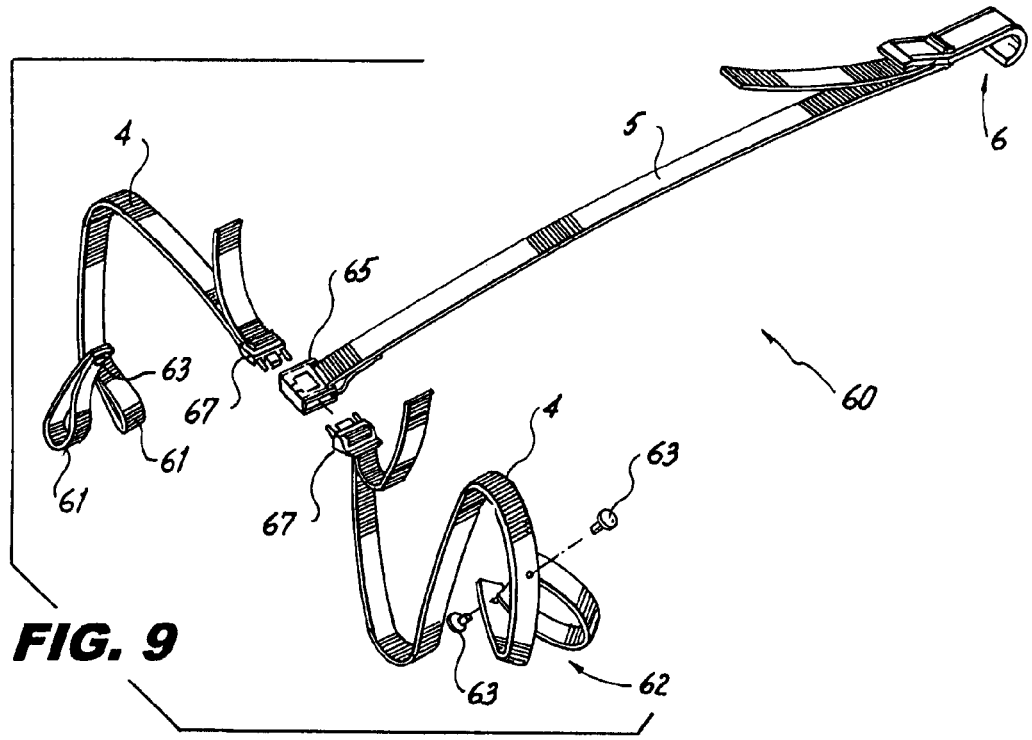
FIG. 9 is a Strap arrangement for attaching the boat cart to the boat being carried.
Figure 10A:
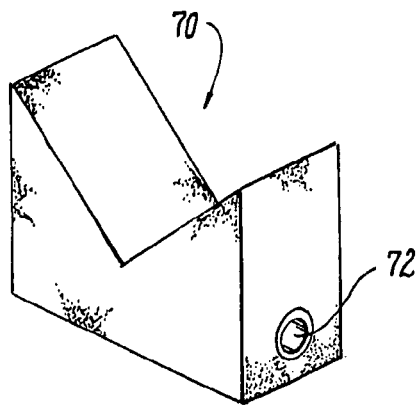
FIG. 10A is a close-up perspective view of an accessory polymer, rubber or foam bumper to protect the bottom of the hull on the end opposite to the one the wheels are attached to as it rests on the ground.
Figure 10B:
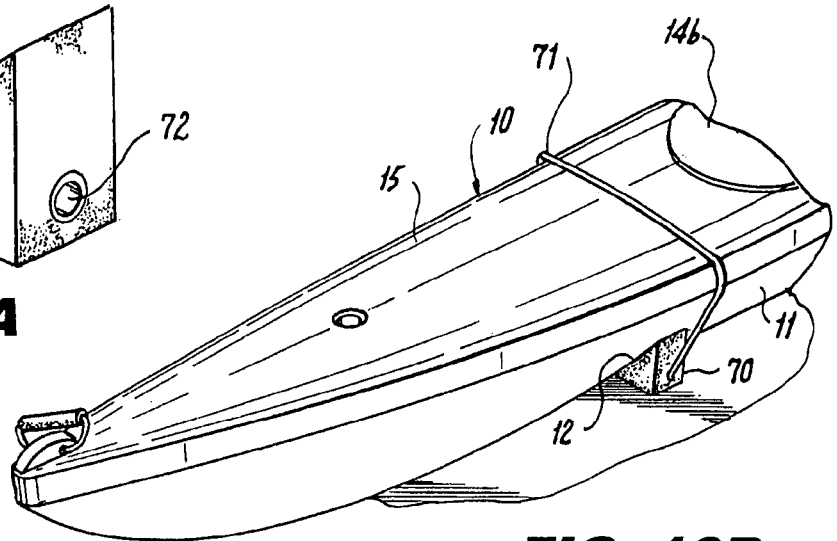
FIG. 10B is a partial perspective view of the bow portion of a kayak supported by the bumper as in FIG. 10A.
Figure 10C:
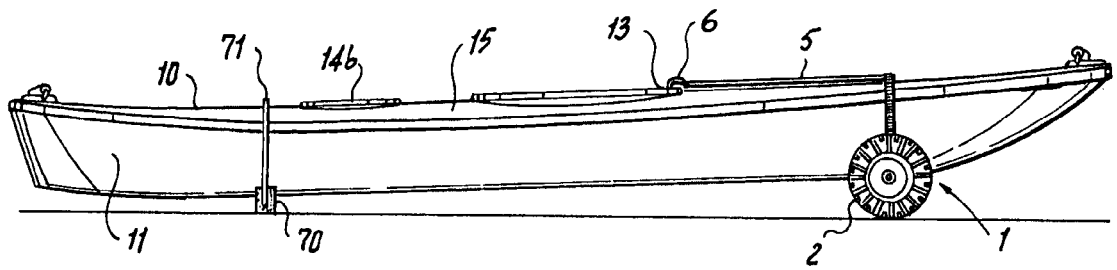
FIG. 10C is a side elevational view of a kayak supported by the bumper as in FIG. 10A and the cart as in FIGS. 1 and 2; and, FIG. 10D is a front elevational view of a kayak supported by the bumper as in FIG. 10A and the cart as in FIGS. 1 and 2.
Figure 10D:
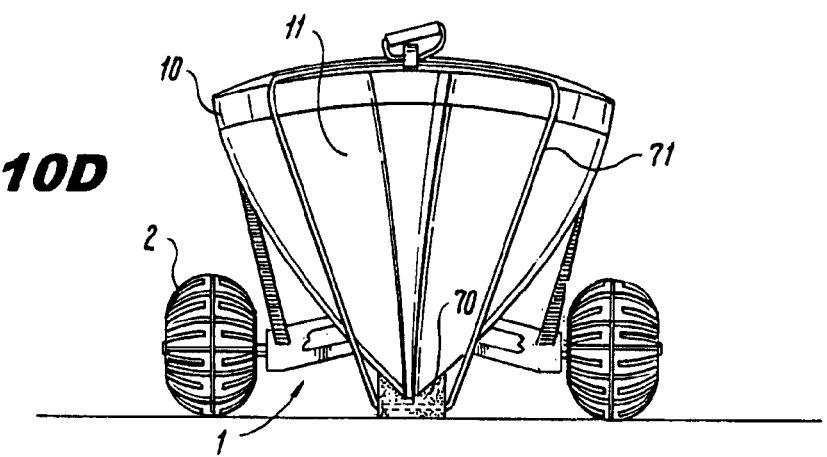

FIG. 9 shows the preferred embodiment 60 of the strap configuration. It is well to review FIGS. 1 and 2 which show the overall positioning of the various strap members on boat and frame. Longitudinal strap 5 has cockpit hook 6 at its distal end and three-way buckle 65 at its proximal end. Transverse strap sections 4 snap into buckle 65 via their male coupling members 67. Strap end 62 is shown prior to assembly into dual loops 61 via grommet fasteners 63. Before strap end 62 is formed into loops 61, it must be threaded through slots 28 in side flanges 21 and 22 of a frame member 20 (as in FIG. 3).

FIGS. 10A, 10B, 10C and 10D show an accessory polymer, rubber or foam bumper 70 to protect the bottom of the hull 11 on the end opposite to the one the wheels are attached to as it rests on the ground. Foam bumper 70 includes hole 72 to accommodate connector strap 71 therethrough, such as an elastic strap, cord or webbing, so that connector strap 71 can wrap around the bow opposite to the stern portion of kayak 10 supported by cart 1.

Furthermore, while the drawing FIGS. 1, 2 and 10A through 10D show cart 1 supporting the stern end of kayak 10, it is noted that cart 1 may be placed at the opposite bow end of kayak 10. In that case, bumper 70 and connector strap 71 would be placed at the opposite stern end of kayak 10.

Additionally, bumper 70 is not necessary for use of cart 1, and is optional.

When completely disassembled, all of the foldable structural frame component parts 20, 20 of the cart 1, as well as the axle parts 50 or 52 etc., as well as wheels 2 or 42 will fit into sealed hatch compartments 14, 14a or 14b of a kayak 10. Sealed hatch compartments 14, 14a or 14b of a typical kayak 10 are generally from about eight to twelve inches in depth, with circular or elliptical openings having a width of from about five to about nineteen inches wide. For example, while dimensions may vary to enable the folded cart to fit within a kayak hatch compartment 14, 14a or 14bb, a preferred embodiment of the main structural frame components 20, 20 folds small enough to stow compactly inside the hatch compartment 14, 14a or 14b of kayak 10, such as a touring or sea kayak or similar craft, requiring about the same space as many compact backpacking stoves or fuel containers. For example, a typical twenty two ounce, six hundred fifty milliliter cylindrical fuel bottle container is generally about nine and one half inches in height and three inches in diameter. Likewise, the folded cart 1 of the present invention is preferably about eight inches in height and three inches at its widest width. Additionally, depending upon wheel size, the wheels 2 or 42 and axle parts 50, 52 etc., will fit either within a hatch compartment 14, 14a or 14b, or in any storage space under the deck 15 of the kayak 10.

Furthermore, if the kayak (not shown) lacks hatch compartments, the structural components 20, wheels 2 or 42 and axle parts 50, 52 etc., will fit under the deck in whatever storage area exists in a typical kayak. Additionally, the component parts 20, wheels 2 or 42 and axle parts 50, 52, etc. will fit in any designated storage area of a canoe (not shown), sit-on-top kayak (not shown) or other small boat (not shown).

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

I claim:

1. A lightweight foldable cart for transporting on wheels one end of a small boat comprising:
   a pair of frame members each being U-shaped with rigid spaced arms extending parallel to each other from ends of a rear plate;
   said frame members being arranged with distal ends of said rigid spaced arms overlapping each other;
   said distal ends of said arms having openings in registry with each other with a shaft extending through said openings, said frame members being rotatable about said shaft from an extended, deployed position to a folded position for storage;
   each rear plate having an opening for an axle supporting a wheel; and
   a removable boat supporting pad mounted on respective distal ends of said arms, said boat supporting pad being shaped to accommodate a bottom of the end of said boat to be supported and transported when said frame members are extended into the deployed position.

2. The foldable cart of claim 1 in which said arms are provided with stops for limiting rotation of said arms into the deployed position so that said boat supporting pad is higher than a wheel axle.

3. The foldable cart of claim 1 further comprising in combination a boat supporting bumper supporting said boat at an opposite end to an end supported by said cart.

4. The foldable cart as in claim 1 wherein said boat supporting pad includes a V-shaped recess accommodating a corresponding V-section of a hull of said bottom of the boat.

5. The foldable cart as in claim 1 wherein said boat supporting pad is attached to said said frame members by said shaft.

6. The foldable cart as in claim 1 wherein said frame members each have inwardly extending stop tabs upon which a base of said boat supporting pad rests, preventing rotation thereof.

7. The foldable cart as in claim 1 wherein said frame members are locked in position in an oblique inverted V-shaped configuration, distributing the weight of the boat support load to wheels at opposite outward ends thereof.

8. The foldable cart of claim 2 wherein said stops lock said frame members in the deployed position.

9. The foldable cart of claim 8 having a harness to secure said end of said boat to said cart and a strap extending from said harness to a front forward part of said boat terminating in a hook member for attachment to a transverse structural member of said boat, said boat being transported by raising the front of said boat and towing.

10. A lightweight foldable cart for transporting on wheels one end of a small boat comprising:
- a pair of rigid, single piece frame members;
- said frame members being pivoted about a pivot joining proximal ends of said frame members;
- said frame members each having an opening for a pivot shaft of said pivot so that when said pivot shaft extends through each said opening, said frame members are rotatable about said pivot shaft from an extended, deployed position to a folded position for storage;
- each frame member at a distal end thereof accommodating an axle for a respective wheel; and
- a boat supporting pad mounted on said pivot when said frame members are deployed to support said boat, said boat supporting pad being shaped to accommodate a bottom of the end of said boat to be supported and transported.

11. The foldable cart of claim 10 in which said frame members are provided with stops for limiting rotation of said arms into the deployed position so that said boat supporting pad is higher than each wheel axle.

12. The foldable cart of claim 10 further comprising in combination a boat supporting bumper supporting said boat at an opposite end to an end supported by said cart.

13. The foldable cart as in claim 10 wherein said boat supporting pad includes a V-shaped recess accommodating a corresponding V-section of a hull of said bottom of the boat.

14. The foldable cart as in claim 10 wherein said boat supporting pad is attached to said proximal ends of said frame members by said pivot.

15. The foldable cart as in claim 10 wherein said frame members each have inwardly extending stop tabs upon which a base of said boat supporting pad rests, preventing rotation thereof.

16. The foldable cart as in claim 10 wherein said frame members are locked in position in an oblique inverted V-shaped configuration, distributing the weight of the boat support load to wheels at opposite outward ends thereof.

17. The foldable cart of claim 11 wherein said stops lock said frame members in the deployed position.

18. The foldable cart of claim 17 having a harness to secure said end of said boat to said cart and a strap extending from said harness to a front forward part of said boat terminating in a hook member for attachment to a transverse structural member of said boat, said boat being transported by raising the front of said boat and towing.

19. A lightweight foldable cart for transporting on wheels one end of a small boat comprising:
- a pair of frame members each being U-shaped with spaced arms extending parallel to each other from ends of a rear plate;
- said frame members being pivoted about a pivot joining proximal ends of said frame members;
- distal ends of said arms each having an opening for a shaft so that when said shaft extends through said openings, joining the distal ends of said arms said frame members can be rotated about said shaft from an extended, deployed position to a folded position for storage;
- each rear plate having an opening for an axle, said axle extending through the openings in said rear plate for supporting rotatable wheels at each end of said axle; and
- a boat supporting pad mountable on respective distal ends of said arms and attached to said pivot when said frame members are extended into the deployed position, said boat supporting pad being shaped to accommodate a bottom of the end of said boat to be supported and transported.

20. A lightweight foldable cart for transporting on wheels one end of a small boat comprising:
- a pair of frame members;
- said frame members being pivoted about a pivot joining proximal ends of said frame members;
- said frame members each having a opening for a pivot shaft of said pivot so that when said pivot shaft extends through said openings said frame members can be rotated about said pivot shaft from an extended, deployed position to a folded position for storage;
- each frame member accommodating an axle for a respective wheel; and
- a boat supporting pad mountable to at least one frame member at a respective distal end of said at least one frame member and attached to said pivot, when said frame members are extended into the deployed position, said boat supporting pad being shaped to accommodate a bottom of the end of said boat to be supported and transported.

* * * * *